United States Patent [19]

Burns

[11] Patent Number: 6,117,519
[45] Date of Patent: Sep. 12, 2000

[54] COMPOSITE CORE MATERIAL, COMPOSITE MATERIAL AND METHOD OF ASSEMBLY

[76] Inventor: Mark L. Burns, 315 Front Beach Dr., Ocean Springs, Miss. 39564

[21] Appl. No.: 09/042,160

[22] Filed: Mar. 13, 1998

Related U.S. Application Data

[60] Provisional application No. 60/041,416, Mar. 19, 1997.
[51] Int. Cl.[7] .................................. B32B 1/00; B32B 3/12
[52] U.S. Cl. .............................. 428/116; 428/118; 428/72; 428/73; 428/77; 52/793.1; 52/309.1; 52/309.15
[58] Field of Search ...................................... 428/116, 117, 428/118, 73, 77, 72; 52/309.1, 793.1, 309.15

[56] References Cited

U.S. PATENT DOCUMENTS

| | | |
|---|---|---|
| 3,697,633 | 10/1972 | Edgar . |
| 4,212,461 | 7/1980 | Cecka . |
| 4,323,623 | 4/1982 | Ahrens . |
| 4,411,939 | 10/1983 | Hawkins . |
| 4,647,063 | 3/1987 | Piringer . |
| 4,769,274 | 9/1988 | Tellvik . |
| 4,964,936 | 10/1990 | Ferro . |
| 5,242,637 | 9/1993 | Inoue . |
| 5,305,568 | 4/1994 | Beckerman ............................. 428/116 |
| 5,451,451 | 9/1995 | Minnick . |
| 5,496,610 | 3/1996 | Landi . |
| 5,667,866 | 9/1997 | Reese, Jr. ................................. 428/118 |
| 5,904,972 | 5/1999 | Tunis, III et al. ...................... 428/118 |

Primary Examiner—Michael Marcheschi

[57] ABSTRACT

A composite material having a core between the layers of reinforcing material that is formed from a plurality of separate and independent cells that are not physically linked to each other as is common with honeycomb structures or cores. Each cell is hollow and is preferably hexagonal in shape. The composite material is formed by placing one or more layers of the first side of the reinforcing material on the mold surface. Said core is then placed on the reinforcing and one or more layers of the second side of the reinforcing material is then placed on top of the core. An inner mold or vacuum bag, depending upon the application and type of reinforcing material, is placed upon the second side of the reinforcing material. Resin or bonding material is then distributed directly into the area of the cells between the two sides of reinforcing material. The channels or canals defined by the space between the core cells become the resin distribution network, thus allowing the resin or bonding to spread throughout the core and saturate the reinforcing material on each side of the cells.

30 Claims, 4 Drawing Sheets

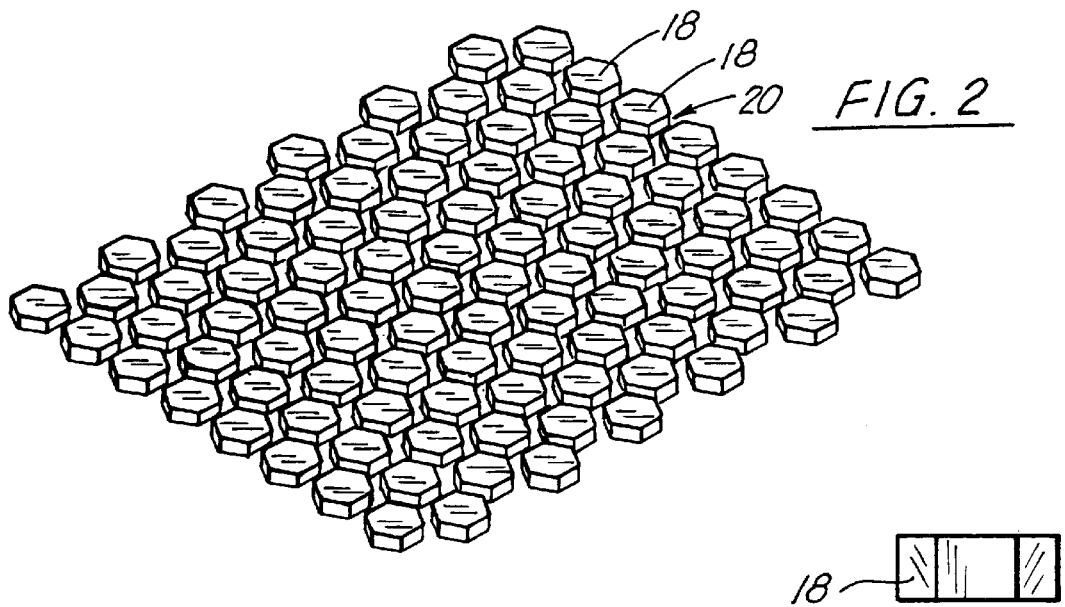
FIG. 2
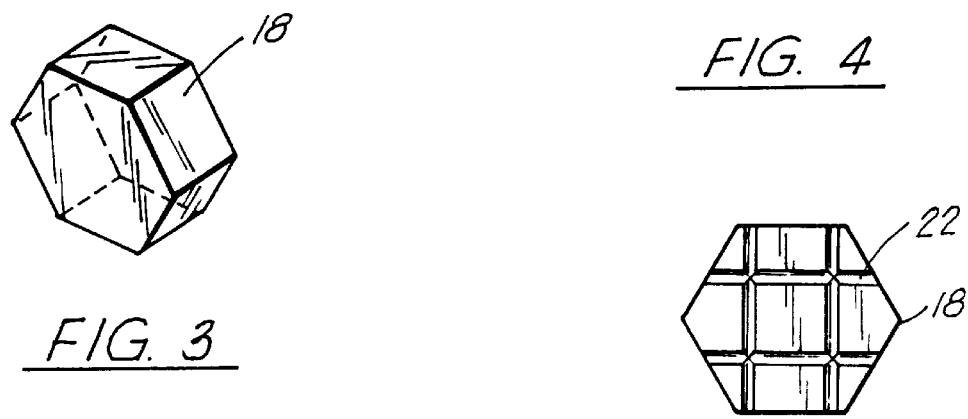
FIG. 4
FIG. 3
FIG. 6
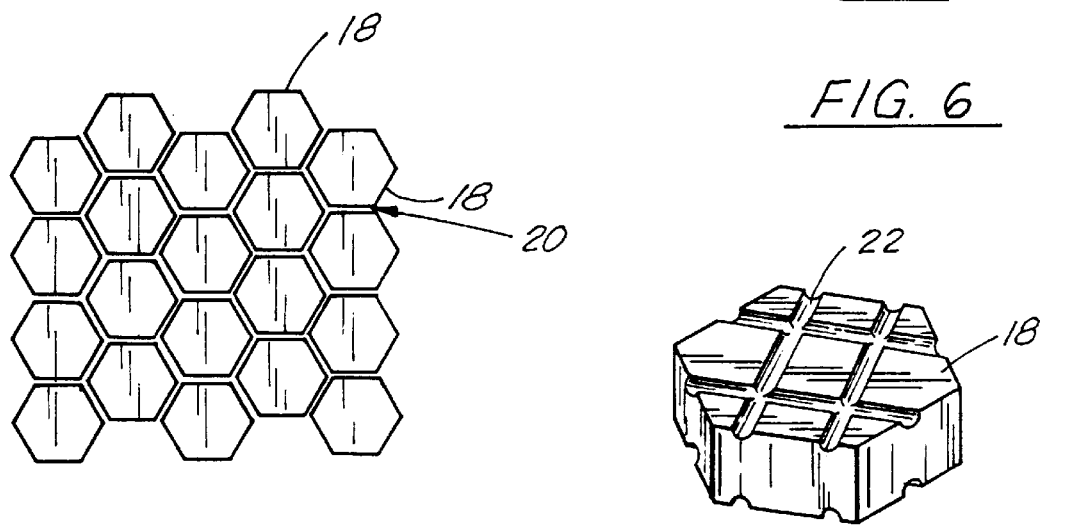
FIG. 5
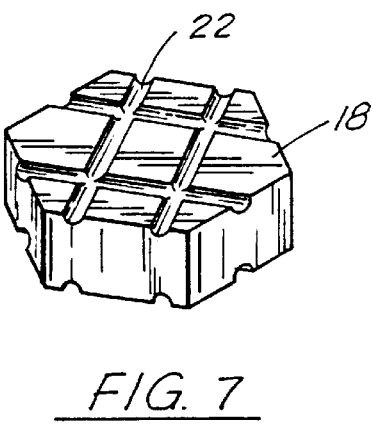
FIG. 7

COMPOSITE CORE MATERIAL, COMPOSITE MATERIAL AND METHOD OF ASSEMBLY

PRIORITY CLAIM STATEMENT

This case is a continuation in part of the U.S. provisional patent specification filed on Mar. 19, 1997, bearing application number 60/041,416.

FIELD OF THE INVENTION

The invention is generally related to a composite core material, a composite material and more particularly to a composite material having a new core structure and a method for assembling the composite material.

BACKGROUND OF THE INVENTION

In the composite industry, several types of designs and shapes are used as cores, sandwiched between layers of reinforcing materials (also referred to as the outer skin) and surrounded by various resins to produce a strong, lightweight composite structure. Honeycomb core sandwich panels have been used as high performance structural elements in advanced composite industries such as aerospace, marine and automotive. Honeycomb cores and sandwich panels for industrial and military applications have been typically made of thermoplastic, aluminum, Nomex and machined honeycomb. Metal/plastic honeycomb panels with custom bonding and custom finishes are available to the present industry. The prior art honeycomb type structures have cells that are contiguous, connected and/or interlocked. The cells are not separated and do not have a space between them. This type of design does not allow for the flow of resin or other bonding material between the cells nor does it allow for a resin bond between the upper and lower skins or layers of reinforcing materials.

The most common materials used for cores are wood (plywood), end grain balsa, plastic and several types of foams designed to accept differential stresses and loads. These materials are handicapped by: (1) delamination from localized impacts; (2) delamination and rot from water and moisture intrusion around fasteners and through cracks in damaged skins; (3) expensive and time consuming manufacturing processes; (4) low strength due to delamination of the outer skin layers of reinforcing materials; (5) manufacturing processes that require vertical channels to allow for resin flow from one layer of the laminate to the other; and (6) environmentally dangerous vapor emissions caused by the application of the resins to the outer skin of reinforcing materials.

Some of the above problems with the present state of the art is a result of the manufacturing and assembly process. Typically, the reinforcing material is placed on each side of the core and resin is then spread over one or both sides of the reinforcing material. There is no direct resin bond between the top and bottom layers or skins of reinforcing material or between core cell members leading to delamination problems and reduced strength. The resin is usually applied by hand in an open environment leading to the escape of environmentally hazardous vapors.

The present core invention is designed to simplify the manufacturing process, to provide for reduced delamination failures and to provide for a stronger, lighter and more versatile composite structure. The manufacturing process can be performed in a closed production mold allowing for simpler and less expensive manufacturing. The closed molding process also prevents the escape of hazardous vapors into the environment.

SUMMARY OF THE INVENTION

The present inventions address the shortcomings in the known art. The inventions are a new core and a composite material comprised of the new core, developed for use in the fiberglass and composite industry, designed to strengthen and stiffen composite structures, as well as to provide a distribution medium for the resin (bonding material) in the molding process. The core is composed of an array or grid of individual closed cells, either solid or hollow, separated by spaces and attached to a sheet of scrim type material creating canals or channels between the cells which allow the resin or bonding material to flow between the individual cells and to be distributed throughout the composite structure by various pressure or vacuum injection molding processes. The resin creates a bond between each cell and between the top and bottom layers of reinforcing material. The scrim material acts only as a separation agent for the placement of the individual cells, designed to maintain a space between each cell. The scrim material can be attached either to the top or bottom of the array or grid of cells by glue or other bonding substance. For more rigidity, the scrim material could be bonded to the top and bottom of the array or grid of cells. Bridges or columns of resin are formed during the assembly process, when the resin or bonding material flows between each cell and between the layers of reinforcing materials. These bridges of resin provide more strength than is typically demonstrated by the honeycomb type core structure where the cells are contiguous and interlocked with each other, especially when the resin is mixed or injected with mill or micro fibers or other high strength materials. The bridges or columns of resin connecting the outer layers of reinforcing material or skin maintain the strength and integrity of the structure preventing delamination and deterioration. The columns of resin also prevent the distribution of moisture which can cause delamination and deterioration. The canals or channels created by the separation of the individual cells allow for a closed, molded type production process which is much more desirable than the typical hand application.

The solid or hollow, closed cells can be made in any shape such as cylindrical, spherical, rectangular, triangular, square or octagonal; however, the hexagonal construction is the preferred design. The use of hollow or solid cells manufactured from a light weight substance such as plastic, nylon, foam or balsa wood, will reduce weight, cost and allow for easy formation of the core to different molds and shapes.

Because of the canals or channels between each cell, compound curves and shapes will be achievable; however, the width of the canals or channels will vary and the cells may even touch and restrict resin flow in some severe bending situations. This potential problem could be eliminated with tapered cells. Additionally, cells of differing heights could be used to allow for tapered or stepped panels.

As an alternative to the scrim design, a small thread of plastic or other connecting material may be used to connect each cell to form a web or grid type design providing proper placement of the cells and maintaining each cell's position and integrity. The small thread of material would serve to maintain each cell's position during the injection of resin or bonding material. Utilizing the small connecting thread of material may allow a higher pressure or vacuum during the assembly process. Further, a higher viscosity of resin material may be used. The connecting thread will also reduce the cost of manufacturing because of the ease of placement of the cell structure. Rather than having to place each cell individually on a scrim material, the web or grid of cells could be easily manufactured in a single stamping or molding process.

A further alternative design would incorporate a bridge of larger and stronger connecting material that is large enough to provide strength and bonding between each cell but not so large as to prevent the free flow of resin or bonding material between the cells. The alternative connecting design will increase the strength and load carrying ability of the core, especially bending type loads.

In order to assure proper saturation and bonding between each cell and the adjacent skin or reinforcing material, canals may be formed into the top and/or bottom side of each cell.

The outer layers of skin or reinforcing material may be made of fiberglass woven fabric, nylon, vinylester, plastic sheet, Kevlar, carbon composites, Mylar, Fibredux, polyester film, or any other type of stress accepting material. The resin can be made of any type of bonding or laminating material such as epoxy resin, polyester or vinylester resins. The scrim type material may be made of cotton, nylon, polyester, plastic, or other type of lightweight material which can distribute the resin uniformly during the assembly process.

What is provided is a composite core comprised of a plurality of separate, individual closed cells (hollow or solid) connected in an array or grid by a scrim type material which maintains a space between each cell creating canals or channels for the flow of resin or other bonding material; said core sandwiched between layers of reinforcing material and surrounded by a resin or bonding material, forming a monolithic type composite material. Instead of utilizing a scrim material to maintain separation between cells, the cells can be joined by a small connecting thread or by a larger, stronger bridge of material used as a stress-bearing member.

The new core is formed by bonding the separate and individual cells to a scrim type material in an array or grid that creates a space between each cell resulting in interlocking canals or channels. The scrim can be bonded by an adhesive to either side of the array of cells or on both top and bottom sides, depending on the application required. A single sided cell attachment will provide for more flexibility. As an alternative to using a scrim material, a small thread of connecting material or a bridge of material can be used to connect the cells thus maintaining a space between each cell.

The composite material is formed by placing one or more layers of the first side of the reinforcing material on a split mold surface ("bottom side"). The new core is then placed on the reinforcing material. One or more layers of the second side of the reinforcing material is then placed on top of the new core. A "top side" of the split mold is placed on the bottom side of the split mold encompassing the core and reinforcing material. A vacuum bag can be used as an alternative to the split mold, depending on the type of application desired. Resin or other bonding material is then pressure or vacuum injected or introduced into the mold, flowing into the canals or channels and covering the layers of reinforcing materials or skins. The channels or canals defined by the space between each cell creates a resin distribution network, thus allowing the resin to spread throughout the core and cover the reinforcing material on each side of the cells. The core design allows for the free flow of resin between each cell providing a strong bond between the cells and between the top and bottom reinforcing materials. Strong, micro fibers can be mixed or injected into the resin to provide for a stronger resin or bonding material. The size of each cell is dependent on the shape, form and stresses expected, all of which are dictated by the application. The size of each channel or canal dictating the distance between each cell is likewise dependent on the shape, form and stresses expected to be encountered.

As an alternative to the molding process, a hand application may also be used. In this type process, the reinforcing skin or material is placed on the mold. A thick, high viscosity slurry of resin or bonding material is then placed on the reinforcing material. The core is then pressed into the slurry and covered with a second reinforcing skin or material. Another application of slurry could then be applied, if required. Naturally, there are other sequences of hand application that would be satisfactory. This hand application is designed to be illustrative and not exhaustive. The disadvantage of this application would be the release of resin vapors into the environment. Further, a uniform resin layer may not be achievable.

It is an object of the inventions to provide a lightweight, inexpensive core material that lays in and conforms to most mold surfaces like a flexible cloth, saving time and money and reducing the level of skill and effort required for lay up.

It is another object of the inventions to provide a composite material that will not absorb or distribute moisture, water or other liquid and can not rot or delaminate because of moisture intrusion.

It is yet another object of the inventions to provide a composite material that prevents delamination caused by localized impact and therefore providing greater strength and integrity of the structure.

Another object of the inventions is to provide a composite material that will not delaminate because of high stresses or bending moments.

Still another object of the inventions is to provide a new core that is easily manufactured and can be used in a multitude of applications where there is a need to bond the outer layers of skin or reinforcing materials together.

It is yet another object of the inventions to provide a new core that will allow fluid flow between cells.

It is another object of the inventions to provide a composite material that is easily manufactured and reduces the emissions of toxic and hazardous vapors into the environment.

An additional object of the inventions is to provide a process of manufacturing the composite material that is less expensive and more efficient than the prior art and produces a monolithic type composite structure.

BRIEF DESCRIPTION OF THE DRAWINGS

For a further understanding of the nature and objects of the present inventions, reference should be made to the following detailed description taken in conjunction with the accompanying drawings in which like parts are given like reference numerals, and wherein:

FIG. 2 is an isometric view of a portion of the cells from FIG. 1. Note that the cell connecting scrim type material is not shown.

FIG. 3 is an isometric view of a single cell from FIG. 2.

FIG. 4 is a side view of a single cell from FIG. 2.

FIG. 5 is a top view of a portion of the cells from FIG. 1. Note that the cell connecting scrim type material is not shown.

FIG. 6 is a top view of an alternate embodiment of one of the cells used in the invention depicting the concave canals or channels placed in the top and/or bottom of each cell.

FIG. 7 is a side perspective view of the cell illustrated in FIG. 6.

DETAILED DESCRIPTION OF THE PREFERRED EMBODIMENT

Figure 1:
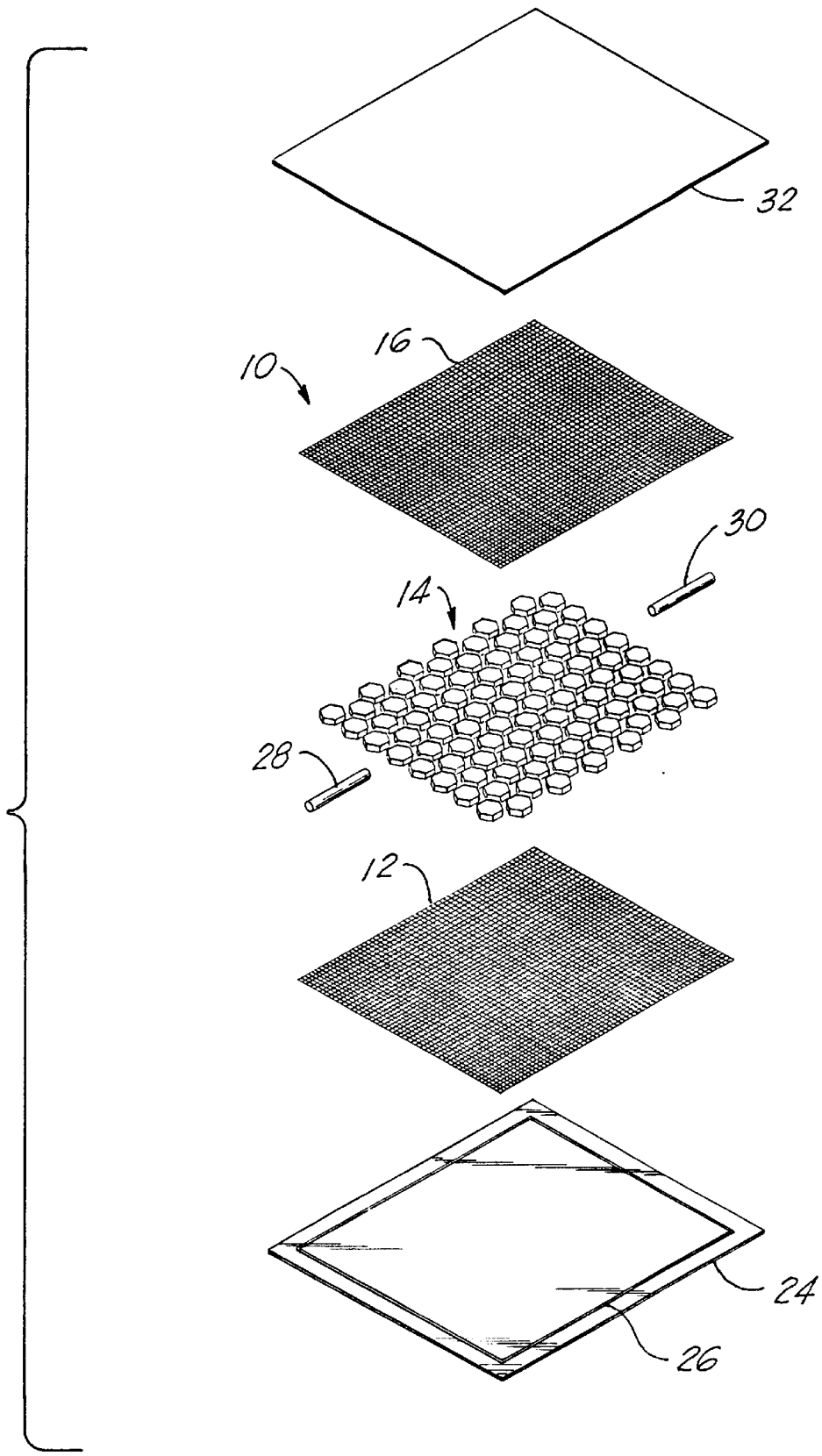
FIG. 1 is a blow up view that illustrates the invention and the sequence of assembly. Note that the cell connecting scrim type material is not shown for clarity purposes.

Referring to the drawings, it can be seen in FIG. 1 that the inventions are generally indicated by the numeral 10. Composite material 10 is generally comprised of a first side 12 of reinforcing material, core 14 (connecting scrim type material not shown), and a second side 16 of reinforcing material.

The material used for first and second sides 12 and 16 can be any type of material that can accept stress type loads. Materials such as fiberglass woven fabric, nylon, plastic, Mylar, Kevlar, carbon composites, Fibredux, polyester film, or another type of stress accepting material may be used. The type of material utilized will depend upon the type of application expected.

Core 14 is formed from a plurality of individual, closed cells 18, best seen in FIG. 2–11. Each cell 18 is preferably hexagonal in section, as seen in the top view of FIG. 5 but can be designed in any shape depending on the type of application sought. Acceptable shapes would be cylindrical, spherical, rectangular, octagonal, square, and triangular. The size of each cell is dependent on the type of application and forces to be encountered. Each cell 18 is preferably hollow, which is important in saving weight. The cells can be solid or even foam filled.

As best seen in FIG. 2 and 5, cells 18 are arranged in an array or grid such that cells 18 are not in contact with each other. This results in the array of cells 14 defining a series of interconnecting channels or canals 20 between cells 18, the importance of which will be described below.

The size of cells 18 and spacing between cells in the array will depend upon the application and use of the core and/or composite material. The spacing between cells will be related to the size and thickness of the cells and the shape that the composite material must conform to, while also keeping the cells as close together as possible to provide a high percentage of hollow space in the core to save weight. Cells 18 may be formed from plastic, nylon, carbon, graphite, wood, foam, balsa wood, metal or any other suitable lightweight material. Cells 18 may also be formed from clear material to allow the use of ultraviolet reactive resins for curing.

In certain applications, it may be necessary to use the alternate embodiment of cell 18 illustrated in FIG. 6 and 7. The alternate embodiment provides concave areas across the top and bottom of each cell to define canals 22 that criss cross the upper and lower surfaces of the cells. These canals 22 on the cells 18 will help to insure the saturation and bonding between the cells and the reinforcing material 12 and 1directly above and below each cell 18.

Figure 8:
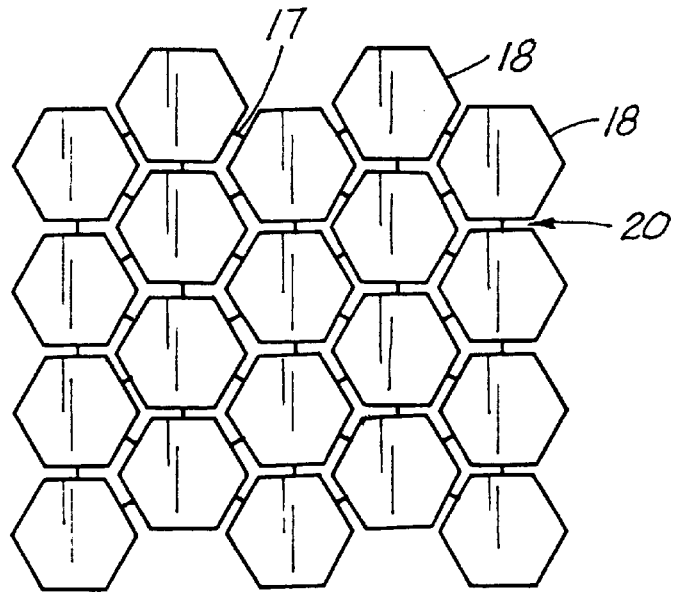
FIG. 8 is a top view of the cells connected by a thread of connecting material to aid in placement and manufacturing process.
Figure 9A:
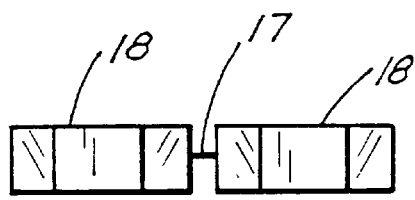
FIG. 9(a), 9(b), and 9(c) are side views of two cells from FIG. 8, depicting different attachment points of the connecting thread.
Figure 9B:
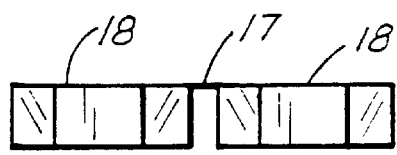
Figure 9C:
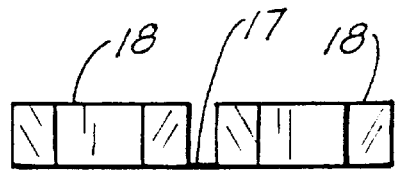

An alternative design utilizes a thread 17, of connecting material which is used solely for the purpose of form and placement during the manufacturing process as illustrated in FIG. 8 and 9. The small connecting thread 17, will help reduce the manufacturing cost by reducing the time to place the cells in a proper array or grid position.

Figure 10:
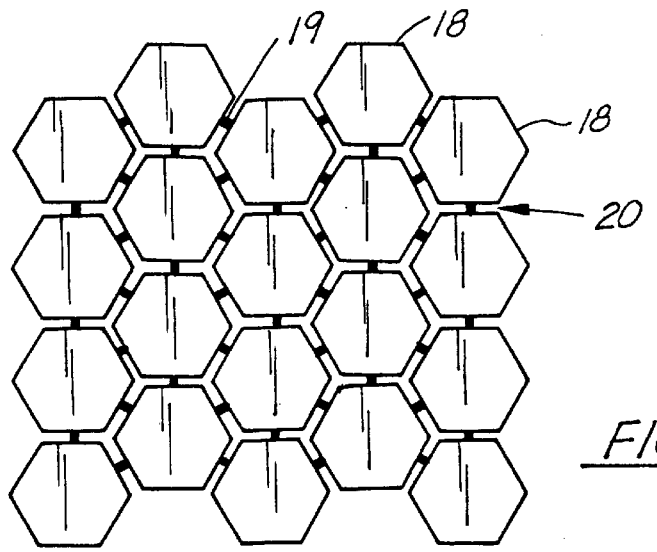
FIG. 10 is a top view of the cells connected by a bridge or strip of strong, connecting material designed to accept stresses and loads but which allows free flow of resin or bonding material.
Figure 11A:
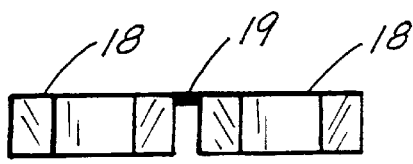
FIG. 11 (a), 11 (b) and 11 (c) are side views of two cells in FIG. 10.
Figure 11B:
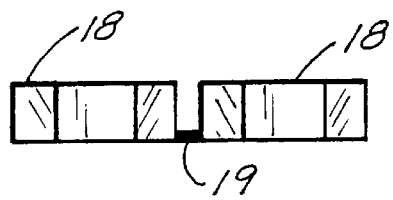
Figure 11C:
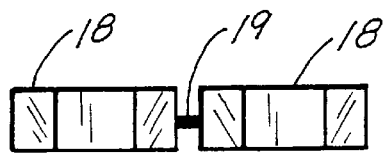

In other applications requiring more strength, it may be necessary to use the alternate embodiment of cell 18 illustrated in FIG. 10, and 11. The alternate embodiment provides a bridge type connection 19, between each cell to accept high stresses and bending loads while at the same time allowing for the free flow of resin or bonding material.

Figure 12:
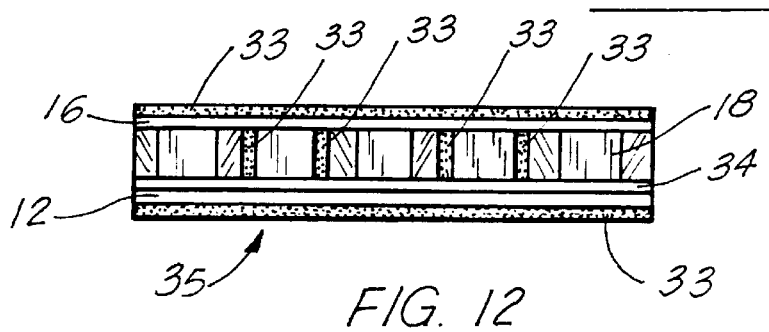
FIG. 12 is a side view of the composite material showing the different layers of material and the cured resin or bonding material between the cells.

FIG. 12 discloses the resin filled canals or channels 20, the cells 18, the reinforcing materials 12 and 16 covered by the resin material 33, and the scrim type material 34; said compilation of materials creating the new composite material 35, as shown in FIG. 12.

Assembly of composite material 10 and 35 is carried out as follows. The first side of a first reinforcing material 12, is placed in a pre-designed first side of split mold 24 which has been properly prepared to release the completed composite and which has been designed in the shape of the desired product. Mold 24 is preferably provided with a seal 26, such as a gasket or sealant, to retain the resin or bonding material during assembly, injection and curing. The first side of the pre-assembled core 14 (array of cells 18 bonded to a scrim type material, or connected by a thread or bridge of connecting material) is placed upon the second side of said first reinforcing material, 12. A first tube is positioned with one end adjacent to the cells 18 and channels 20 defined therebetween. The second end of tube 28 is in communication with a source of resin or bonding material not shown for injecting resin or bonding material into the space between the array of cells 20 and between the cells and the skin of reinforcing materials. A second tube 30 is positioned on the opposite side of the core 14. Second tube 30 may serve the purpose of pressure relief if the resin is pressure injected or may be attached to a vacuum source not shown if a vacuum is to be used in the process.

The first side of a second reinforcing material 16, is then placed upon the second side of core 14. The second side of split mold 32 is then placed upon first side of split mold 24; said mold surrounding the core and reinforcing material. The mold may be a split rigid type comprised of two parts or a vacuum bag if such an operation is to be used. The mold is utilized to distribute the resin or other bonding material throughout the core and around the reinforcing materials in a closed process environment.

First tube 28 is then used to inject resin into the channels 20 defined between cells 18 in the core 14. Pressure is relieved through second tube 30, which also gives an indication that enough resin has been injected when it begins to appear in the second tube 30. Second tube 30 may also be used in conjunction with a vacuum source not shown to help draw resin into the core channels and to surround the reinforcing materials. The resin contacts the individual cells and the first and second sides of the reinforcing fabric and, once cured bonds these layers together in a monolithic type structure. The assembly is cured according to industry standards for the type of reinforcing material and resin used. The first and second mold surfaces are removed and the composite material 10 is then ready for the next manufacturing step in preparation for use in the final intended product.

In hand process applications, the first side of a first reinforcing material 12 is placed on an open mold or location of utilization. A slurry of resin or other bonding material is then uniformly applied by hand on the second side of said first reinforcing material assuring that the reinforcing material is covered in the slurry of resin. The pre-assembled core 14 is then embedded into the slurry so that it is covered by the resin. The first side of a second reinforcing material 16 is then placed upon the top of the slurry covered core 14. Additional resin slurry may then be applied, if required. The composite material, as assembled, is then dried until the slurry is hardened.

For applications where extra thickness or strength is required, multiple layers of core 14 may be used, with one or more layers of reinforcing material between each layer of core material.

Because many varying and differing embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A composite core, consisting essentially of:
   a. a first side of scrim connecting material;
   b. a plurality of separate and individal, closed cells having a top and bottom surface, spaced apart from each other to form an array or grid which defines a series of interconnecting channels or canals between said cells, which cells are bonded onto said first side of said scrim material.

2. The composite core of claim 1, wherein said individual cells are hollow.

3. The composite core of claim 1, wherein said individual cells are solid.

4. The composite core of claim 1, wherein said individual cells are hexagonal in section.

5. The composite core of claim 1, wherein said individual cells are octagonal in section.

6. The composite core of claim 1, wherein said individual cells are rectangular in section.

7. The composite core of claim 1, wherein said individual cells are square in section.

8. The composite core of claim 1, wherein said individual cells are circular in section.

9. The composite core of claim 1, wherein said individual cells have a plurality of concave canals along the top and bottom surfaces of each cell.

10. A composite core, consisting essentially of:
    a. a plurality of individual, closed cells having a top and bottom surface, spaced apart from each other to form an array or grid defining a series of interconnecting channels or canals between said cells and which said cells are connected by a thread of connecting material.

11. The composite core of claim 10, wherein said individual cells are hollow.

12. The composite core of claim 10, wherein said individual cells are solid.

13. The composite core of claim 10, wherein said individual cells are hexagonal in section.

14. The composite core of claim 10, wherein said individual cells are octagonal in section.

15. The composite core of claim 10, wherein said individual cells are rectangular in section.

16. The composite core of claim 10, wherein said individual cells are square in section.

17. The composite core of claim 10, wherein said individual cells are circular in section.

18. The composite core of claim 10, wherein said individual cells have a plurality of concave canals along the top and bottom surfaces of each cell.

19. A composite core, consisting essentially of:
    a. a plurality of individual, closed cells having a top and bottom surface, spaced apart from, each other to form an array or grid defining a series of interconnecting channels or canals between said cells and which said cells are connected by a bridge of connecting material.

20. The composite core of claim 19, wherein said individual cells are hollow.

21. The composite core of claim 19, wherein said individual cells are solid.

22. The composite core of claim 19, wherein said individual cells are hexagonal in section.

23. The composite core of claim 19, wherein said individual cells are octagonal i n section.

24. The composite core of claim 19, wherein said individual cells are rectangular in section.

25. The composite core of claim 19, wherein said individual cells are square in section.

26. The composite core of claim 19, wherein said individual cells are circular in section.

27. The composite core of claim 19, wherein said individual cells have a plurality of concave canals along the top and bottom surfaces of each cell.

28. A composite material, comprising:
   a. a first side of a first reinforcing material;
   b. a first side of composite core of claim 1, placed upon the first side of said first reinforcing material;
   c. a first side of a second reinforcing material placed upon a second side of said composite core; and
   d. a resin or bonding material occupying the canals or channels defined between said cells of composite core and in contact with said first and second reinforcing materials whereby said resin or bonding material bonds the reinforcing materials and the composite core together.

29. A composite material, comprising:
   a. a first side of a first reinforcing material;
   b. a first side of the composite core of claim 10, placed on the first side of said first reinforcing material;
   c. first side of a second reinforcing material placed upon a second side of said composite core; and
   d. a resin or bonding material occupying the canals or channels defined between said cells of composite core and in contact with said first and second reinforcing materials whereby said resin or bonding material bonds the reinforcing materials and the composite core together.

30. A composite material, comprising;
   a. a first side of reinforcing material;
   b. a first side of the composite core of claim 19, placed upon the first side of said first reinforcing material,
   c. a first side of a second reinforcing material placed upon a second side of said composite core; and
   d. a resin or bonding material occupying the canals or channels defined between said cells of composite core and in contact with said first and second reinforcing materials whereby said resin or bonding material bonds the reinforcing materials and the composite core together.

* * * * *